US008463260B2

United States Patent
Wu

(10) Patent No.: US 8,463,260 B2
(45) Date of Patent: Jun. 11, 2013

(54) METHOD OF HANDLING SYSTEM INFORMATION RECEPTION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 226 days.

(21) Appl. No.: 12/730,244

(22) Filed: Mar. 24, 2010

(65) Prior Publication Data

US 2010/0255838 A1 Oct. 7, 2010

Related U.S. Application Data

(60) Provisional application No. 61/165,524, filed on Apr. 1, 2009.

(51) Int. Cl.
*H04W 4/00* (2009.01)
(52) U.S. Cl.
USPC ........ 455/434; 455/432.1; 455/437; 455/438; 455/426.1
(58) Field of Classification Search
USPC .................. 455/432.1, 436–444; 370/331
See application file for complete search history.

(56) References Cited

U.S. PATENT DOCUMENTS

| 8,000,706 | B2 * | 8/2011 | Lee et al. | 455/435.2 |
| 2009/0017820 | A1 * | 1/2009 | Sohn et al. | 455/435.2 |
| 2010/0035575 | A1 * | 2/2010 | Wu | 455/404.1 |
| 2011/0177820 | A1 * | 7/2011 | Westroos et al. | 455/438 |

OTHER PUBLICATIONS

Panasonic: "LTE-advanced discussion for RAN2", 3GPP TSG RAN WG2 #65bis, R2-092394, Mar. 23rd-27th, 2009, XP050340115, Seoul, Korea.
Sharp: "CoMP configuration for multiple component carriers in LTE-A", 3GPP TSG RAN WG1 Meeting #56bis, R1-091134, Mar. 23-27, 2009, pp. 1/2-2/2, XP050338758, Seoul, Korea.
Qualcomm Europe: "Notion of Anchor Carrier in LTE-A", 3GPP TSG RAN WG1 #56, R1-090860, Feb. 9th-13th, 2009, pp. 1/5-5/5, XP050318710, Athens, Greece.
LG Electronics: "UE-specific Carrier Assignment for LTE-Advanced", 3GPP TSG RAN WG1 Meeting #56bis, R1-091207, Mar. 23-27, 2009, XP050338822, Seoul, Korea.
3GPP TS 36.331 V8.5.0 3rd Generation Partnership Project; Technical Specification Group Radio Access Network; Evolved Universal Terrestrial Radio Access (E-UTRA) Radio Resource Control (RRC); Protocol specification (Release 8), Mar. 2009.
3GPP TR 36.814 V0.4.1 3rd Generation Partnership Project; Technical Specification Group Radio Access Network; Further Advancements for E-UTRA Physical Layer Aspects (Release 9), Feb. 2009.

* cited by examiner

*Primary Examiner* — Charles Shedrick
(74) *Attorney, Agent, or Firm* — Winston Hsu; Scott Margo

(57) ABSTRACT

A method of handling system information reception for a mobile device capable of multiple connections in a wireless communication system, the method includes acquiring system information of at least a cell when a radio resource control (RRC) message for connection establishment related to the cells is received from a first cell having at least a connection with the mobile device.

16 Claims, 3 Drawing Sheets

METHOD OF HANDLING SYSTEM INFORMATION RECEPTION AND RELATED COMMUNICATION DEVICE

CROSS REFERENCE TO RELATED APPLICATIONS

This application claims the benefit of U.S. Provisional Application No. 61/165,524, filed on Apr. 1, 2009 and entitled "Method for Handling System Information Reception in Multiple Connections in a Wireless Communication System," the contents of which are incorporated herein in their entirety.

BACKGROUND OF THE INVENTION

1. Field of the Invention

The application relates to a method utilized in a wireless communication and a communication device thereof, and more particularly, to a method of handling system information reception in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, so that the system structure becomes simple.

In the LTE system, a user equipment (UE) applies a system information acquisition procedure to acquire system information broadcasted by an Evolved Universal Terrestrial Radio Access Network (E-UTRAN) upon selecting and upon re-selecting a cell, after handover completion, after entering the E-UTRAN from another radio access technology (RAT), upon receiving an indication about the presence of an Earthquake and Tsunami Warning System (ETWS) notification, etc. The system information includes most essential and most frequently transmitted parameters that are needed to acquire other information of a cell for connection establishment.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multi-point transmission/reception (COMP), uplink multiple input multiple output (MIMO), etc.

For bandwidth extension, carrier aggregation is introduced to the LTE-Advanced for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographically separated points. That is, when an UE is in a cell-edge region, the UE is able to receive signal from multiple cells, and the multiple cells can receive transmission of the UE.

However, in the LTE system, the system information acquisition is defined for the UE having only one connection to a single cell with a single component carrier. For the UE operated in the LTE-A system, there is no system information acquisition mechanism defined for the UE to acquire system information of additional cells for establishing at least a connection to the additional cells. Therefore, the UE has difficulty in establishing new connections with new cells since the LTE-Advanced system does not specify how the system information acquisition is applied for the UE capable of multiple connections to multiple cells with the same component carrier or different component carriers. Moreover, usage of the system information of the multiple cells is never concerned. Improper usage of the system information of the multiple cells may cause cell configuration problems.

The applicant noticed a mobility management problem related to a tracking area update as below based on a direct image on a basis of a combination of the prior art LTE and LTE-Advanced system. Within an evolved packet core (EPC), a registration area is defined as a set of tracking areas and each of these tracking areas consists of one or more cells that cover a geographical area. Each tracking area is broadcast in a cell, identified by a tracking area code (TAC) and a public land mobile network (PLMN) identifier. The UE considers itself registered to a list of tracking areas and does not need to trigger tracking area update as long as it stays in one of the tracking areas of the list of tracking areas received from the EPC.

Consider a scenario that a UE in a RRC (Radio Resource Control) connected mode has a connection to a cell in a tracking area controlled by a first evolved packet core (EPC1), and is then configured a new connection to a new cell. If the new cell is in a tracing area different from the one that the UE currently registers, the UE performs the tracking area update. Further, if the tracking area of the new cell is controlled by a second EPC (EPC2), the UE notifies the EPC2 of the new tracking area via the tracking area update. Under this situation, the UE becomes a work load of the EPC 2. As can be seen from the above, the UE autonomously performing such tracking area update causes a load change from the EPC1 to EPC2, and the load change is unexpected by the network. Thus, the abovementioned tracking area update is not well controlled by the network, thereby impacting load balance between EPCs.

SUMMARY OF THE INVENTION

The application discloses a method of handling system information reception in a wireless communication system and a related communication device in order to solve the abovementioned problems.

A method of handling system information reception is disclosed for a mobile device capable of multiple connections in a wireless communication system. The method comprises acquiring system information of at least a cell when a radio resource control (RRC) message for connection establishment related to the cells is received from a first cell having at least a connection with the mobile device.

A method of handling system information reception is disclosed for a mobile device having a plurality of connections to a plurality of cells in a wireless communication system comprising a network. The method comprises receiving a radio resource control (RRC) message indicating that one of the plurality of cells is a serving cell from the network, determining the cell indicated by the RRC message as the serving cell of the mobile device, and applying system information of the serving cell.

A communication device of a wireless communication system for handling system information reception is disclosed. The communication device capable of multiple connections comprises means for establishing at least a connection to a first cell, and means for acquiring system information of at least a cell when a radio resource control (RRC) message for connection establishment related to the cells is received from the first cell.

A communication device of a wireless communication system comprising a network for handling system information reception is disclosed. The communication device having a plurality of connections to a plurality of cells comprises means for receiving a radio resource control (RRC) message indicating that one of the plurality of cells is a serving cell from the network, means for determining the cell indicated by the RRC message as the serving cell of the mobile device, and means for applying system information of the serving cell.

These and other objectives will no doubt become obvious to those of ordinary skill in the art after reading the following detailed description of the preferred embodiment that is illustrated in the various figures and drawings.

DETAILED DESCRIPTION

Figure 1:
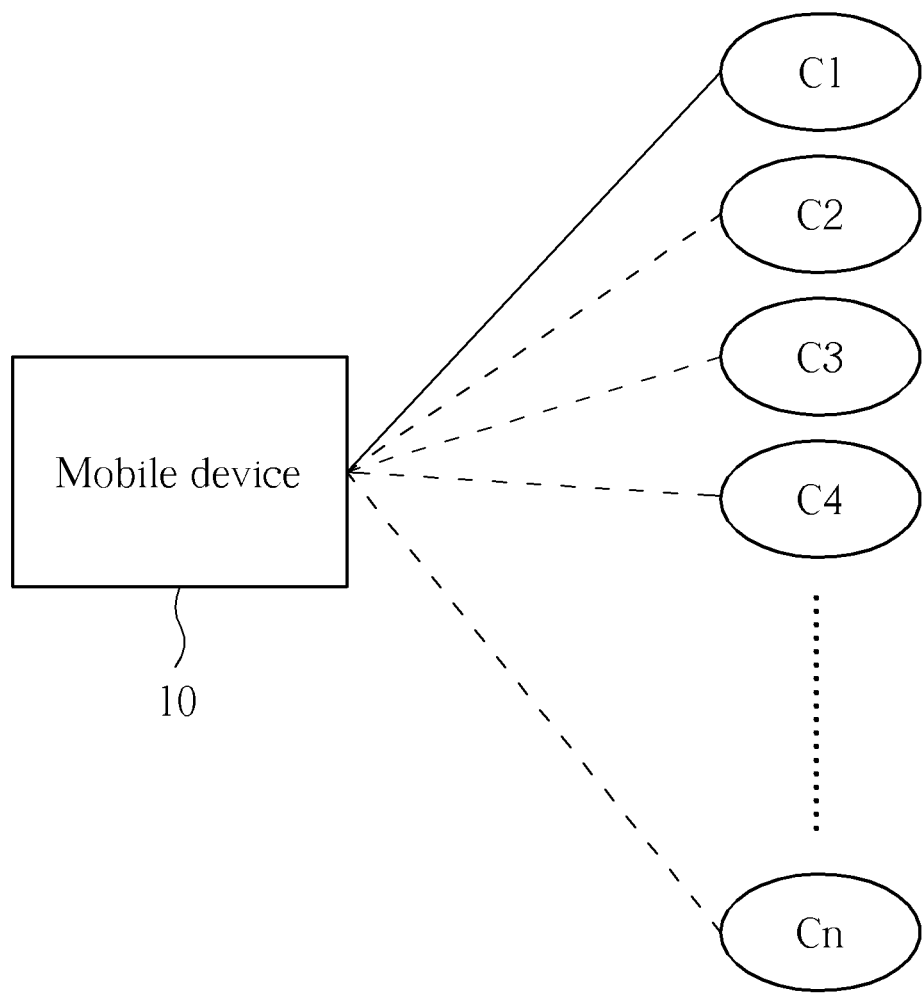
FIG. 1 is a schematic diagram of a wireless communication system.

Please refer to FIG. 1, which illustrates a schematic diagram of connections between a mobile device 10 and cells C1-Cn. In FIG. 1, the mobile device 10 is served by the cell C1, and has a connection to the cell C1. The cell C1 can send a radio resource control (RRC) message to the mobile device 10 for connection establishment with any of the cells C2-Cn. The connection with the cell C1 and a connection with any of the cells C2-Cn can be in the same or different component carriers configured in the UE, and each of the cells C1-Cn supports a LTE radio access technology (RAT) or an E-UTRAN (Evolved Universal Terrestrial Radio Access Network) RAT. In addition, the mobile device 10 is referred as a user equipment (UE) or a mobile station (MS), and can be a device such as a mobile phone, a computer system, etc.

Figure 2:
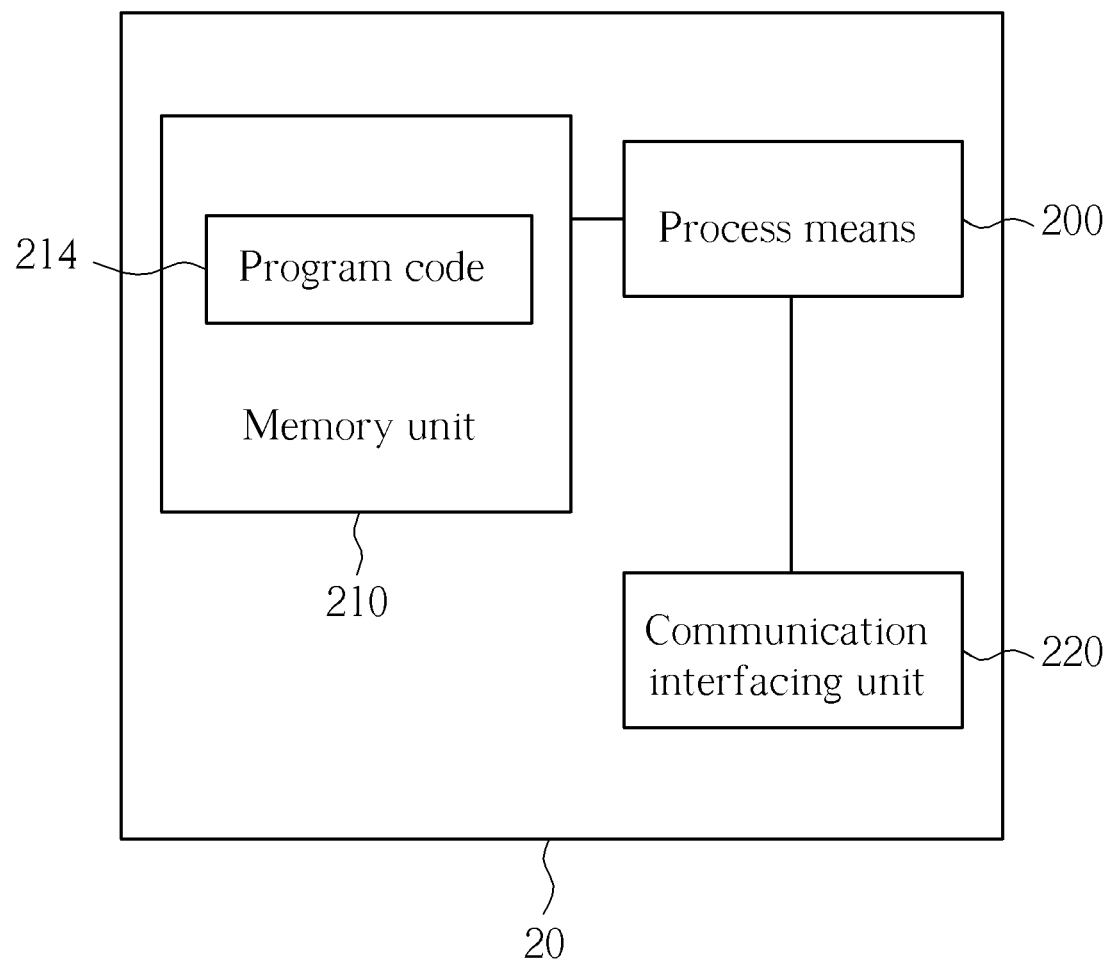
FIG. 2 is a schematic diagram of an exemplary communication device according to an embodiment.

FIG. 2 illustrates a schematic diagram of a communication device 20 according to an example. The communication device 20 can be the mobile device 10 shown in FIG. 1 and may include a processor means 200 such as a microprocessor or ASIC, a memory unit 210 and a communication interfacing unit 220. The memory unit 210 may be any data storage device that can store program code 214, for access by the processing means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

The program code 214 includes a program code of a RRC layer which can establish connections to the cells C1-Cn respectively. The RRC layer is used for performing RRC connection establishment, re-establishment, reconfiguration, or other RRC procedures, and is responsible for generating or releasing radio bearers (RBs) including data RBs (DRBs) and signaling RBs (SRBs). Through use of the SRBs, the RRC layer and the cells C1-Cn can exchange RRC messages for radio resource settings.

Figure 3:
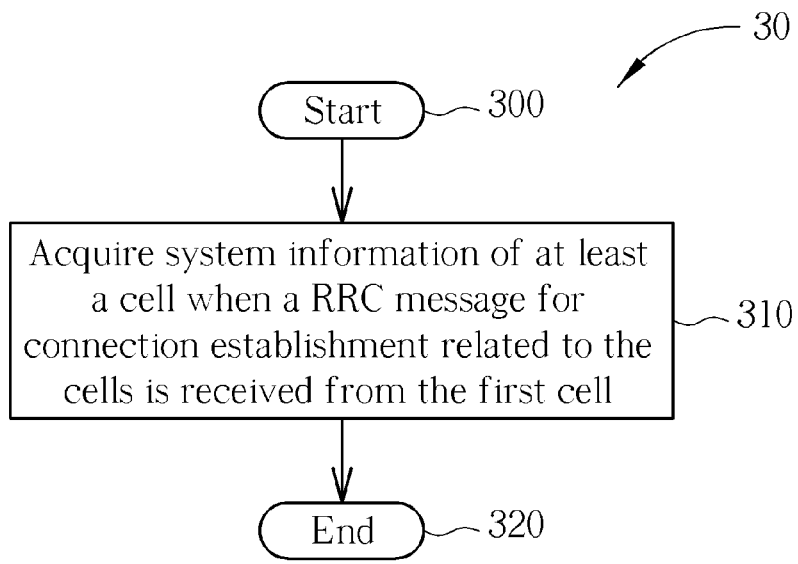
FIG. 3 is a flowchart of an exemplary process according to a first embodiment.

Please refer to FIG. 3, which illustrates a flowchart of a process 30 according to an example. The process 30 is utilized in the UE having at least a connection to a first cell for handling system information reception. The process 30 can be compiled into the program code 214 and includes the following steps:

Step 300: Start.

Step 310: Acquire system information of at least a cell when a RRC message for connection establishment related to the cells is received from the first cell.

Step 320: End.

According to the process 30, the UE acquires the system information of at least an additional cell when receiving the RRC message from the first cell. The RRC message may indicate to the UE to acquire the system information of the additional cells for the RRC connection establishment.

During acquisition of the system information of the additional cells, the UE may not initiate the connection establishment until a valid version of the system information of any of the additional cells is received. That is, after the UE acquires the valid version of the system information of one of the additional cells, the UE may store the valid version of the system information and initiate the RRC connection establishment to establish at least a connection to the cell. The valid version of the system information of the corresponding cell may include a MasterInformationBlock (MIB), a SystemInformationBlockType1 (SIB1), and a SystemInformationBlockType2 (SIB2).

Each of the acquired system information may include non cell specific information and cell specific information. The cell specific information may be used for connection control or measurement, and includes information of cell identity, barred cell, radio resource configuration, frequency, etc. The non cell specific information may be used for cell configuration, and includes at least one of an Earthquake and Tsunami Warning System (ETWS) message, geographical information, and a value of a timer T311 related to the RRC connection re-establishment.

Referring back to FIG. 1, let's take an example associated with connection establishment based on the concept of the process 30. As shown in FIG. 1, the UE has established a connection to the cell C1. Therefore, the cell C1 can configure the UE to establish connections to any of the cells C2-Cn by sending a RRC message which indicates to the UE to acquire system information of any of the cells (e.g. the cells C2-C4). When the UE acquires the system information of the cells C2-C4, the UE may not immediately initiate the connection establishment. After the valid version of the system information of the cells C2-C4 is acquired, the UE then performs the connection establishment for establishing at least a connection to each of the cells C2-C4. In addition, when the UE acquires the system information of the cells C2-C4, the UE applies the cell specific information (i.e. the cell identity) of the corresponding acquired system information for a connection to each of the cells C2-C4. Please note that, the UE does not apply any of the non cell specific information in the acquired system information of the cells C2-C4 unless the RRC message indicates to the UE to apply.

For example, the UE can apply the geographical information of the non cell specific information in the system information of one of the cells C2-C4 when the RRC message indicates to the UE to apply the geographical information in the system information of the corresponding cell. The geographical information may include a tracking area code, a public land mobile network (PLMN) identity list or both. When the UE applies the geographical information, the UE performs a tracking area update to forward the geographical information (e.g. the tracking area code or the PLMN identity) to an upper layer (i.e. Non Access Stratum (NAS) layer) of the UE and to notify an evolved packet core (EPC). Therefore, when any of the cells C2-C4 belongs to a tracking area different from the one that the UE current registers (i.e. the tracking area of the cell C1), the UE does not apply the geographical information of the non cell specific information in the system information of the cells C2-C4 if the RRC message does not indicate to the UE to apply the geographical information. That is, the UE does not autonomously perform a tracking area update to the EPC when any of the tracking areas of the cells C2-C4 is different with that of the cell C1. As a result, if the tracking area of the cell C1 is controlled by a first evolved packet core (EPC1) and the tracking areas of the cells C2-C4 are controlled by a second EPC (EPC2), the UE does not become a work load of the EPC2 since the UE does not autonomously perform the tracking area update to the EPC2. In other words, the UE performs the tracking area update to forward the geographical information only if the tracking area of any of the cells C2-C4 is different with the cell C1 and the RRC message indicates to the UE to forward the geographical information of the non cell specific information of the system information of the cell. As abovementioned, the UE is requested to perform the tracking area update by the RRC message received from a network (i.e. the cell C1). Therefore, the tracking area update associated with the abovementioned multiple connection establishments is well controlled by the network.

In addition, the RRC message may indicate that one of the cells (e.g. C1-C4) whose system information is acquired is a serving cell, and thereby the UE applies the non cell specific information of the system information of the indicated serving cell. In this case, assume that the RRC message indicates that the cell C2 is the serving cell. The serving cell may control other cells (e.g. the cells C1, C3, and C4) to manage radio resource, security or mobility of the UE. The UE determines the cell C2 as the serving cell, and applies the non cell specific information of the system information of the cell C2. That is, the UE applies the non cell specific information including at least one of ETWS message, geographical information, and the timer T311 value in the system information of the serving cell for serving cell configuration.

Base on the concept of the process 30, the UE can acquire system information of the additional cells for establishing connections to the additional cells.

Figure 4:
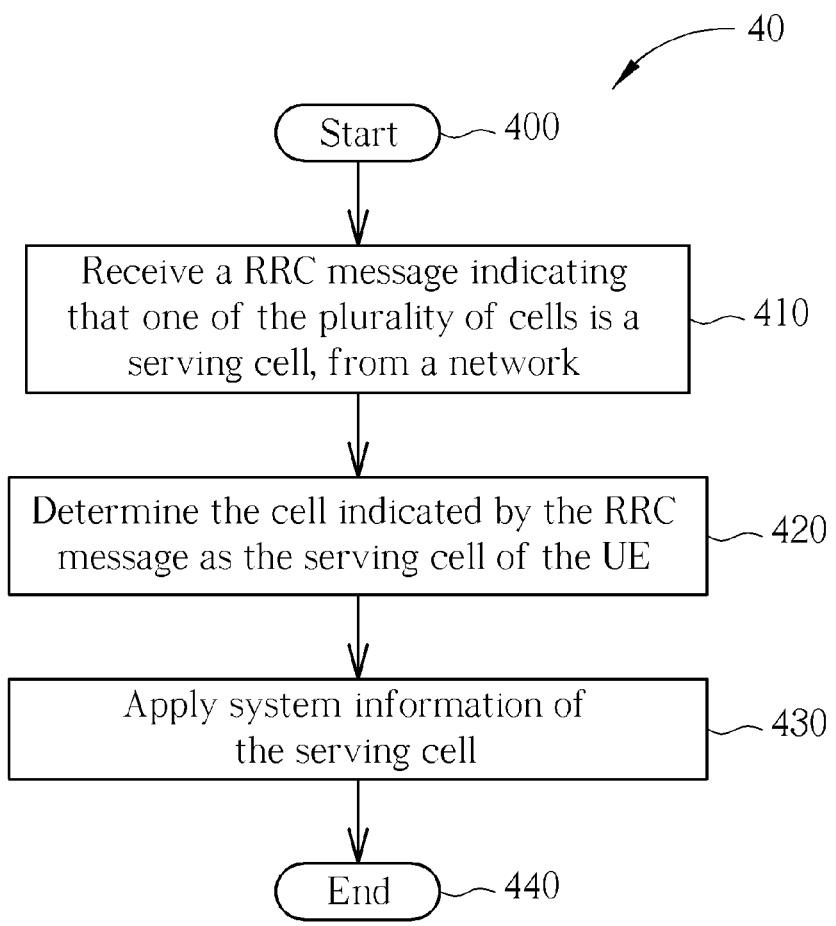
FIG. 4 is a flowchart of an exemplary process according to a second embodiment.

In order to clearly understand the concept of the present application, please refer to FIG. 4, which illustrates a flowchart of a process 40 according to an example of the present application. The process 40 is utilized in the UE having a plurality of connections to a plurality of cells for handling system information reception. The process 40 can be compiled into the program code 214 and includes the following steps:

Step 400: Start.
Step 410: Receive a RRC message indicating that one of the plurality of cells is a serving cell, from a network.
Step 420: Determine the cell indicated by the RRC message as the serving cell of the UE.
Step 430: Apply system information of the serving cell.
Step 440: End.

According to the process 40, the UE determines one of the plurality of cells as the serving cell based on the RRC message, and then applies the system information including the non cell specific information and the cell specific information of the serving cell. More specifically, when the UE acquires the system information of the plurality of cells, the UE applies the non cell specific information of the acquired system information of the serving cell only, and applies the cell specific information of the acquired system information of the plurality of cells including the serving cell.

The abovementioned cell specific information may include the cell identity, barred cell, radio resource configuration, frequency, etc, and the non cell specific information may include the ETWS message, geographical information, and timer T311 value. The detailed description of the non cell specific information and the cell specific information can be referred to from the above, so the detailed description is omitted herein.

Referring back to FIG. 1, let's take an example based on the process 40. The UE has established the plurality of connections to the plurality of cells (e.g. the cells C1-Cn). When the UE receives, from the network, the RRC message indicating that one of the cells C1-Cn is the serving cell (e.g. the cell C2), the UE determines the cell C2 as the serving cell, and applies the system information of the cell C2. As abovementioned, the UE applies the non cell specific information of the system information of the cell C2, and applies the cell specific information of the system information of the cells C1-Cn. With such manner, when the UE acquires the system information of the cells C1-Cn, the UE can clearly know which system information of the acquired system information of the cells C1-Cn should be used. For example, the timer T311 values in the acquired system information of the cells C1-Cn are different. Under this situation, the UE use a value of the timer T311 in the acquired system information of the cell C2 for the RRC connection re-establishment, but does not use a random value of the timers T311 from the acquired system information of the cell C1 and C3-Cn. That is, the UE only uses the timer T311 value in the acquired system information of the serving cell. Therefore, usage of the acquired system information of the cells C1-Cn is clearly specified.

Base on the concept of the process 40, the UE applies the system information of the serving cell assigned by the network through the RRC message, thereby avoiding improper usage of the system information of the plurality of cells.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the abovementioned examples provide ways of acquiring and applying system information of multiple cells for connection establishment, and preventing improper usage of the system information of the cells.

Those skilled in the art will readily observe that numerous modifications and alterations of the device and method may be made while retaining the teachings and spirit and scope of the invention. Accordingly, the above disclosure should be construed as limited only by the metes and bounds of the appended claims.

What is claimed is:

1. A method of handling system information reception for a mobile device capable of multiple connections in a wireless communication system, the method comprising:
   acquiring system information of at least an additional cell when a radio resource control (RRC) message indicating connection establishment to the additional cells is received from a first cell having at least a connection with the mobile device, wherein the acquired system information includes geographical information; and
   skipping a tracking area update, when the additional cell whose system information is acquired is in a tracking area different from a tracking area of the first cell and the RRC message does not indicate to the mobile device to apply the geographical information.

2. The method of claim 1 further comprising:
   initiating establishment of at least a connection to one of the cells when a valid version of the system information of the cell is acquired, wherein the valid version of the system information of the cell includes a MasterInformationBlock (MIB), a SystemInformationBlockType1 (SIB1), and a SystemInformationBlockType2 (SIB2).

3. The method of claim 1 further comprising:
   performing the tracking area update when the RRC message or a second RRC message indicates to the mobile device to forward the geographical information in the acquired system information of the additional cell and the additional cell is in a tracking area different from the first cell, wherein the geographical information in the acquired system information of the cell is forwarded to an upper layer of a RRC layer of the mobile device via the tracking area update.

4. The method of claim 3, wherein the geographical information comprises at least one of a tracking area code and a public land mobile network (PLMN) identity list.

5. The method of claim 1, wherein the acquired system information includes non cell specific information, and cell specific information for cell connection or measurement, wherein the non cell specific information includes at least one of a Earthquake and Tsunami Warning System (ETWS) message, a Public Land Mobile Network (PLMN) identity list, a tracking area code and a value of a timer T311.

6. The method of claim 5 further comprising:
   applying the cell specific information of the acquired system information.

7. The method of claim 5 further comprising:
   when the RRC message indicates that one of the additional cells or the first cell whose system information is acquired is a serving cell, determining the indicated cell as the serving cell of the mobile device; and
   applying the non cell specific information of the acquired system information of the serving cell.

8. The method of claim 7 further comprising applying the non cell specific information only for configuration associated with the serving cell.

9. A communication device of a wireless communication system for handling system information reception, the communication device capable of multiple connections comprising:
   means for establishing at least a connection to a first cell;
   means for acquiring system information of at least an additional cell when a radio resource control (RRC) message indicating connection establishment to the additional cells is received from the first cell, wherein the acquired system information includes geographical information; and
   means for skipping a tracking area update, when the additional cell whose system information is acquired is in a tracking area different from a tracking area of the first cell and the RRC message does not indicate to the mobile device to apply the geographical information.

10. The communication device of claim 9 further comprising:
    means for initiating establishment of at least a connection to one of the cells when a valid version of the system information of the cell is acquired, wherein the valid version of the system information of the cell includes a MasterInformationBlock (MIB), a SystemInformationBlockType1 (SIB1), and a SystemInformationBlockType2 (SIB2).

11. The communication device of claim 9 further comprising:
    means for performing the tracking area update when the RRC message or second RRC message indicates to the mobile device to forward the geographical information in the acquired system information of the additional cell and the additional cell is in a tracking area different from the first cell, wherein the geographical information in the acquired system information of the cell is forwarded to an upper layer of a RRC layer of the mobile device via the tracking area update.

12. The communication device of claim 11, wherein the geographical information comprises at least one of a tracking area code and a public land mobile network (PLMN) identity list.

13. The communication device of claim 12 further comprising:
    when the RRC message indicates that one of the additional cells or the first cell whose system information is acquired is a serving cell, means for determining the indicated cell as the serving cell of the mobile device; and
    means for applying the non cell specific information of the acquired system information of the serving cell.

14. The communication device of claim 13 further comprising means for applying the non cell specific information only for configuration associated with the serving cell.

15. The communication device of claim 9, wherein the acquired system information includes non cell specific information, and cell specific information for cell connection or measurement, wherein the non cell specific information includes at least one of a Earthquake and Tsunami Warning System (ETWS) message, a Public Land Mobile Network (PLMN) identity list, a tracking area code and a value of a timer T311.

16. The communication device of claim 15 further comprising:
    means for applying the cell specific information of the acquired system information.

* * * * *